US012708873B2

(12) United States Patent
Shimada

(10) Patent No.: US 12,708,873 B2
(45) Date of Patent: Aug. 18, 2026

(54) MICROORGANISM DEODORIZING DEVICE AND DEODORIZATION TREATMENT SYSTEM

(71) Applicant: MIRAIE CORPORATION, Shimane (JP)

(72) Inventor: Yoshihisa Shimada, Shimane (JP)

(73) Assignee: MIRAIE CORPORATION, Shimane (JP)

( * ) Notice: Subject to any disclaimer, the term of this patent is extended or adjusted under 35 U.S.C. 154(b) by 942 days.

(21) Appl. No.: 17/437,283

(22) PCT Filed: Feb. 25, 2020

(86) PCT No.: PCT/JP2020/007294
§ 371 (c)(1),
(2) Date: Sep. 8, 2021

(87) PCT Pub. No.: WO2020/184159
PCT Pub. Date: Sep. 17, 2020

(65) Prior Publication Data

US 2022/0161189 A1 May 26, 2022

(30) Foreign Application Priority Data

Mar. 12, 2019 (JP) ................................ 2019-045125
Feb. 17, 2020 (JP) ................................ 2020-024256

(51) Int. Cl.
*B01D 53/84* (2006.01)
*B01D 53/38* (2006.01)
(Continued)

(52) U.S. Cl.
CPC ............ *B01D 53/84* (2013.01); *B01D 53/38* (2013.01); *B01D 53/85* (2013.01); (Continued)

(58) Field of Classification Search
None
See application file for complete search history.

(56) References Cited

U.S. PATENT DOCUMENTS

2009/0078639 A1* 3/2009 Pride .................. B01D 39/1676 210/290
2012/0202275 A1* 8/2012 Uribe ..................... B01D 53/85 435/297.1
2015/0053080 A1* 2/2015 Boehringer .............. B01J 39/00 422/616

FOREIGN PATENT DOCUMENTS

DE 4235591 A1 * 11/1993 ............. B01D 46/30
DE 202008009666 U1 * 1/2009 ............. B01D 46/10
(Continued)

OTHER PUBLICATIONS

Machine translation for JP 11-309334 A (Nov. 9, 1999). (Year: 1999).*

(Continued)

*Primary Examiner* — Jennifer A Leung
(74) *Attorney, Agent, or Firm* — STAAS & HALSEY LLP

(57) ABSTRACT

A deodorizing tank of a microorganism deodorizing device may include an airflow passage through which air passes from a chamber unit to an opening portion; and the airflow passage is provided with a deodorizing unit in which a foam material is filled, a ventilation resistance layer to reduce a flow velocity of the air flowing through the deodorizing unit, and a chamber unit including a chamber which temporarily stores the air fed to the deodorizing tank and diffuses the air in a horizontal direction; and the diffused air is spread in the chamber unit so that the diffused air reaches substantially an entire area of the deodorizing unit in the horizontal direction.

14 Claims, 7 Drawing Sheets

(51) Int. Cl.
*B01D 53/85* (2006.01)
*C02F 3/30* (2023.01)

(52) U.S. Cl.
CPC .......... *B01D 2251/95* (2013.01); *C02F 3/302* (2013.01); *C02F 2303/02* (2013.01)

(56) References Cited

FOREIGN PATENT DOCUMENTS

| | | | | |
|---|---|---|---|---|
| JP | 6-72617 | | | 10/1994 |
| JP | 6-81617 | U1 | | 11/1994 |
| JP | 11-309334 | A | | 11/1999 |
| JP | 2001-334124 | A | | 12/2001 |
| JP | 2005-013885 | A | | 1/2005 |
| JP | 2011-056339 | A | | 3/2011 |
| JP | 2014-4522 | A | | 1/2014 |
| JP | 6445665 | B1 | | 12/2018 |
| KR | 101206936 | B1 | * | 12/2012 |

OTHER PUBLICATIONS

Machine translation for JP 2005-013885 A (Jan. 20, 2005). (Year: 2005).*

G. S. Bhat. Chapter 12: Flame resistant nonwoven fabrics. Handbook of fire resistant textiles, pp. 322-348. 2013. (Year: 2013).*

Translation of JP 11-309334 A (Nov. 9, 1999). (Year: 1999).*

Extended European Search Report dated Oct. 20, 2022 in corresponding European Patent Application No. 20768962.1 (8 pages).

International Search Report (Form PCT/ISA/210); mailed Apr. 28, 2020 in corresponding PCT Application No. PCT/JP2020/007294; (3 pages) (2 pages English Translation).

Written Opinion; (Form PCT/ISA/237); mailed Apr. 28, 2020 in corresponding PCT Application No. PCT/JP2020/007294; (5 pages).

Japanese Office Action issued in Japanese Application No. 2020-024256 dated Oct. 24, 2023.

* cited by examiner

MICROORGANISM DEODORIZING DEVICE AND DEODORIZATION TREATMENT SYSTEM

CROSS REFERENCE TO RELATED APPLICATIONS

This application is a U.S. National Stage Application under 35 U.S.C. § 371 of PCT International Patent Application No. PCT/JP2020/007294, filed on Feb. 25, 2020, which claims the foreign priority benefit under 35 U.S.C. § 119 of Japanese Patent Application No. 2019-045125, filed on Mar. 12, 2019, and Japanese Patent Application No. 2020-024256, filed on Feb. 17, 2020, in the Japanese Patent Office, the contents of both of which International Patent Application and the Japanese Application are incorporated by reference herein in their entirety.

FIELD

The present invention relates to a microorganism deodorizing device and a deodorization treatment system for deodorizing an odor component of air by a microorganism holding carrier.

BACKGROUND

In various facilities, such as composting facilities and sewage treatment facilities which generate high-concentration malodor, which are accompanied by the generation of malodor, if the generated malodor is discharged to the atmosphere as it is, troubles are caused with neighboring residents. Therefore, measures against odor are indispensable to harmonize with local communities.

Conventionally, as a device for removing malodor, for example, there is a technique disclosed in Patent Document 1. The technology relates to a deodorizing device in which a microorganism holding carrier is accommodated in a deodorizing tank, and air containing malodor is fed into the deodorizing tank to decompose and deodorize odor components by microorganisms living in the microorganism holding carrier.

In the technology disclosed in Patent Document 1, a water sprinkling device and a gas discharge port are provided in an upper area in the deodorizing tank, and the water sprinkling device and a water storage unit communicate with each other via a circulation means. Therefore, organic acid supplied from the gas supply port comes into contact with a deodorizing material in the deodorizing tank which has been brought into a wet state by the water sprinkling device, and is dissolved in water. At the same time, some organic acid is decomposed by the microorganisms in the deodorizing material and discharged from the gas discharge port. The water dropped from the deodorizing material to the water storage unit is circulated from the water storage unit to the water sprinkling device by the circulation means, and sprinkled again to the deodorizing material.

LIST OF DOCUMENTS

Patent Documents

Patent Document 1: Japanese Patent Application Publication No. 2011-56339

SUMMARY

Technical Problem

In sewage treatment facilities in sewerage, paper factories, and the like, high-concentration sulfur-based odor such as hydrogen sulfide and methyl sulfide is generated. In the case of sulfur-based odor, the microorganisms decompose the sulfur compounds to generate sulfuric acid when sulfur bacteria are mainly fixed to the microorganisms for deodorization.

In this case, when the circulating water system described in Patent Document 1 described above is adopted, there is a problem that the concentration of sulfuric acid in the circulating water increases every time water is circulated, and the hydrogen ion concentration of the circulating water decreases to around pH=1, so that microorganisms cannot live.

Therefore, to prevent the death of microorganisms, it is necessary to administer an alkaline neutralizing agent to the circulating water. When the neutralizing agent is not administered, the water in the water storage unit is required not to be circulated or to be overflowed from the water storage unit, which causes a new problem of an increase in tap water usage.

In pig farms, excretion treatment facilities called closed vertical fermenters are widely used, but these facilities generate malodor at extremely high concentration of 2000 to 3000 ppm or higher of $NH_3$. Further, the exhaust gas has a high temperature of about 50° C. to 70° C. Conventionally, a water scrubber (cleaning deodorization) has been used for deodorization of such an excretion treatment facility, but the amount of water used exceeds 100 tons per day per facility, and the environmental burden is extremely large.

If biological deodorization is to be employed for the treatment of such a high-concentration malodor, in the conventional biological deodorization, it is necessary to dilute the concentration in advance because bacteria are inactivated by flowing ammonia of 400 ppm or higher of $NH_3$. Further, since the exhaust gas of the closed vertical fermenter has a high temperature of about 60° C. and also exceeds the reaction temperature zone of bacteria (40° C. or less), it is also necessary to lower the temperature. For example, in the case of malodor of 3000 ppm of $NH_3$, the gas concentration needs to be diluted 7.5 times to make the gas concentration 400 ppm, and there arises a problem that the deodorizing facility becomes large and expensive because the gas flow rate is greatly increased.

The present invention has been made in view of such problems, and an object thereof is to provide a microorganism deodorizing device capable of sufficiently exhibiting a decomposition-deodorization function while suppressing an increase in manufacturing cost even in a large-scale device including a large-sized deodorizing tank.

Further, it is an object of the present invention to provide a deodorization treatment system capable of preventing water flowing in a microorganism deodorizing device from adversely affecting microorganisms, continuing deodorization, and reducing the amount of water used.

Solution to Problem

To solve the problems described above, the disclosure herein provides a microorganism deodorizing device including a hollow deodorizing tank which accommodates a foam material as a microorganism holding carrier, and configured to feed air into the deodorizing tank and to decompose and deodorize an odor component contained in the air using microorganisms living in the foam material accommodated in the deodorizing tank. Here, the deodorizing tank forms an airflow passage through which the air passes from one side to the other side. The airflow passage is provided with a deodorizing unit in which the foam material is filled, a ventilation resistance portion arranged close to or adjacent to the deodorizing unit and configured to increase ventilation resistance of the air flowing through the airflow passage, and a chamber unit arranged close to or adjacent to the deodorizing unit and/or the ventilation resistance portion as a chamber which temporarily stores the air fed to the deodorizing tank. Further, the air is fed to the deodorizing unit in a state of being spread in the chamber unit over a substantially entire surface of the deodorizing unit as a result of that the ventilation resistance of flow of the air flowing through the airflow passage is increased by the ventilation resistance portion.

According to the disclosure herein the ventilation resistance portion is formed as a ventilation resistance layer which is arranged as facing a flow direction of the air in the airflow passage and which covers a substantially entire surface of the airflow passage.

According to the disclosure herein the ventilation resistance portion includes, in addition to the ventilation resistance layer, a ventilation resistance protrusion protruding inward from a wall surface at an inner circumference of the deodorizing tank.

According to the disclosure herein the airflow passage is formed in a state of flowing the air upward from below the deodorizing tank, and the chamber unit includes an introduction portion configured to introduce the air into the chamber unit, and a diffusion passage formed as a flow passage for diffusing, in a horizontal direction, the air flowing in from the introduction portion.

According to the disclosure herein the diffusion passage is formed by a plurality of U-shaped grooves.

According to the disclosure herein a fall prevention member having a substantially mesh shape configured to prevent the foam material from falling into the chamber unit is arranged above the chamber unit.

In addition to the disclosure herein the microorganism deodorizing device further includes a water sprinkling pipe configured to introduce water to be sprinkled to the foam material, and a water storage tank configured to store the sprinkled water and arranged below the deodorizing tank. Here, the water sprinkling pipe is arranged along the deodorizing tank as being capable of circulating and sprinkling water stored in the water storage tank.

The microorganism deodorizing device disclosed herein may include a sewage treatment facility which introduces sewage from an inflow passage, performs purification treatment on the sewage, and discharges the treated water to an outflow passage; and a water sprinkling unit configured to sprinkle a portion of the treated water to microorganisms in the microorganism holding carrier as introducing the portion to the microorganism deodorizing device and to return the sprinkled water having passed through the microorganism deodorizing device to the inflow passage side of the sewage treatment facility.

Advantageous Effects

The disclosure herein includes the ventilation resistance portion to increase the ventilation resistance of the air flowing through the airflow passage, the chamber unit arranged close to or adjacent to the deodorizing unit and/or the ventilation resistance portion as a chamber to temporarily store the air fed into the deodorizing tank. As a result of that the ventilation resistance of flow of the air flowing through the airflow passage is increased by the ventilation resistance portion, the air is fed to the deodorizing unit in a state of being spread in the chamber unit over the substantially entire surface of the deodorizing unit. Accordingly, the air fed into the deodorizing tank is fed to the deodorizing unit in a state of being diffused over substantially the entire chamber unit and the air containing odor becomes easily in contact with the microorganism holding carrier in the entire deodorizing unit. Therefore, even without performing forcible stirring of air in the deodorizing tank by an air stirring device or the like, odor is decomposed and deodorized by the microorganisms in the entire area of the deodorizing unit, and highly efficient deodorization can be performed. Accordingly, even in a large-scale device including a large-sized deodorizing tank, it is possible to sufficiently exhibit a decomposition-deodorization function while suppressing an increase in manufacturing cost.

According to the disclosure herein the ventilation resistance portion is formed as a ventilation resistance layer which is arranged as facing a flow direction of the air in the airflow passage and which covers a substantially entire surface of the airflow passage. As a result of that easy air flow is disturbed over the entire airflow passage, the air containing odor fed to the deodorizing tank is easily spread over the entire area of the deodorizing unit, and the flow velocity of the air flowing through the deodorizing tank is suppressed, so that the air containing odor can be in contact with the microorganism holding carrier over the entire area of the deodorizing unit for a long time. Therefore, even in a large-scale device including a large deodorizing tank, it is possible to efficiently perform the decomposition and deodorization of odor by microorganisms in the entire area of the deodorizing unit, and to exhibit a higher decomposition-deodorization function.

According to the disclosure herein the ventilation resistance portion includes, in addition to the ventilation resistance layer, a ventilation resistance protrusion protruding inward from a wall surface of an inner circumference of the deodorizing tank. Accordingly, the function of suppressing the flow of air in the vicinity of the wall surface portion inside the deodorizing tank through which air easily flows is further enhanced, and as a result, the air containing odor fed to the deodorizing tank is more easily spread over the entire area of the deodorizing tank as staying inside the deodorizing tank. Accordingly, even in a large-scale device including a large-sized deodorizing tank, it is possible to exhibit a higher decomposition-deodorization function while suppressing an increase in manufacturing cost.

According to the disclosure herein the chamber unit is arranged below the deodorizing unit in the deodorizing tank, the airflow passage is configured to allow air to flow upward from below the deodorizing tank, and the chamber unit is provided with the introduction portion for introducing air into the chamber unit, and the diffusion passage as the flow passage for horizontally diffusing air flowing in from the introduction portion. Accordingly, the air fed from the introducing portion can be diffused horizontally in the chamber unit and fed into the deodorizing unit. This makes it easier for the air containing odor to be spread over the entire area of the deodorizing tank. Accordingly, even in a large-scale device including a large-sized deodorizing tank, it is possible to exhibit a higher decomposition-deodorization function while suppressing an increase in manufacturing cost.

According to the disclosure herein the diffusion passage is formed by a plurality of U-shaped grooves. Accordingly, it is possible to form the diffusion passage at low cost and to easily form a configuration in which air fed from the introduction portion is diffused horizontally in the chamber unit.

According to the disclosure herein a fall prevention member having a substantially mesh shape configured to prevent the foam material from falling into the chamber unit is arranged above the chamber unit. Accordingly, it is possible to reliably prevent, with a simple configuration, a situation in which the foam material falls into the chamber unit to block the airflow passage in the chamber unit and air containing odor is not spread over the deodorizing tank.

According to the disclosure herein the water storage tank storing the sprinkled water is provided below the deodorizing tank, and when the acidic concentration of the water is low, the water to be sprinkled to the deodorizing unit can be used while being circulated. Then, when the acidic concentration of the water becomes high, the treated water purified by the sewage treatment facility is allowed to flow in without constantly circulating water.

Further, since the water sprinkling pipe is arranged along the deodorizing tank, the water sprinkling pipe through which the water to be sprinkled flows is naturally kept warm by heat generated by microorganisms in the deodorizing tank. Therefore, even when the microorganism deodorizing device is used in a cold place, freezing of the water flowing in the water sprinkling pipe can be suppressed easily and reliably.

According to the disclosure herein the water sprinkling unit is configured to sprinkle some of the treated water of the sewage treatment facility to microorganisms in the microorganism holding carrier as introducing to the microorganism deodorizing device and to return the sprinkled water having passed through the microorganism deodorizing device to the inflow passage side of the sewage treatment facility. Accordingly, it is possible to prevent the microorganisms from being adversely affected by continuing to circulate the water flowing in the microorganism deodorizing device and to continue deodorization, thereby reducing the amount of water used.

Further, since the treated water discharged to the outflow passage of the sewage treatment facility is used as the water flowing in the microorganism deodorizing device, the water temperature is not high, and air flowing in the microorganism deodorizing device is cooled to maintain the reaction temperature range of the microorganisms, so that the decomposition-deodorization function by the microorganisms can be sufficiently exhibited.

DETAILED DESCRIPTION

First Embodiment

Hereinafter, a first embodiment of the present invention will be described with reference to FIGS. 1 to 4.

[Overall Configuration of Deodorization Treatment System]

Figure 1:
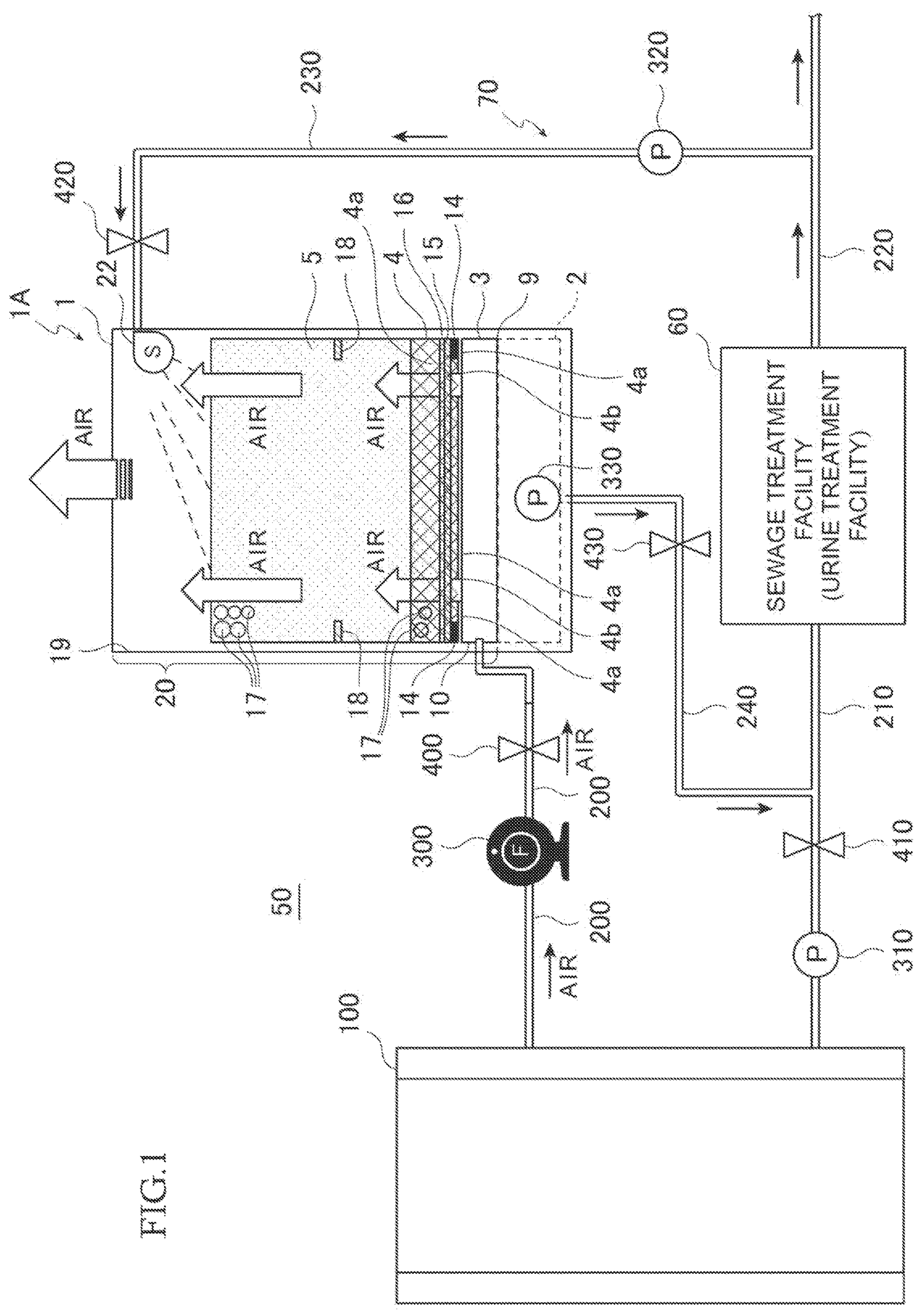
FIG. 1 is a diagram schematically showing the overall configuration of a deodorization treatment system according to a first embodiment.

FIG. 1 is a diagram schematically showing the overall configuration of a deodorization treatment system according to the first embodiment.

As shown in FIG. 1, a deodorization treatment system 50 includes a sewage treatment facility 60, a microorganism deodorizing device 1A, and a water sprinkling unit 70.

Each of various facilities 100 generates air containing malodor, and the air is sent to the microorganism deodorizing device 1A, deodorized in the microorganism deodorizing device 1A, and released into the atmosphere. Further, each facility 100 generates sewage, and the sewage is sent to the sewage treatment facility 60, purified by the sewage treatment facility 60, and discharged as treated water. The water sprinkling unit 70 guides a portion of the treated water discharged from the sewage treatment facility 60 to the microorganism deodorizing device 1A, sprinkles the portion to the microorganism deodorizing device 1A, and then returns the water that has been sprinkled and has passed through the microorganism deodorizing device 1A to the inflow side of the sewage treatment facility 60.

Each facility 100 is any of devices, equipment, facilities, and the like that generate air containing sewage and malodor. Specifically, for example, each facility 100 is a facility such as a livestock barn, a paper factory, a chemical factory, and a food factory that generates sewage and high-concentration malodor, but may be any other facility as long as the facility generates sewage and air containing malodor. It is assumed that each facility 100 is any of large-sized facilities and devices that discharge a large amount of sewage and air containing malodor, but the facilities and devices are not limited thereto and may be small-sized facilities and devices.

The facility 100 is connected to the microorganism deodorizing device 1A through an exhaust pipe 200. The specific configuration and effects of the microorganism deodorizing device 1A will be described later.

The facility 100 is connected to the sewage treatment facility 60 through a sewage pipe 210. The sewage pipe 210 is provided with a pump 310 for supplying sewage generated at the facility 100 to the sewage treatment facility 60 and an on-off valve 410 for opening and closing. Therefore, by opening the on-off valve 410 and driving the pump 310, the sewage generated at the facility 100 can be allowed to flow into the sewage treatment facility 60 through the sewage pipe 210. A treated water pipe 220 as an "outflow passage"

through which treated water subjected to sewage treatment is discharged is connected to the sewage treatment facility 60.

The sewage treatment facility 60 performs, for example, nitrogen treatment by organisms as sewage treatment for sewage containing nitrogen components such as protein and ammonia discharged from the facility 100 such as a livestock barn, a paper factory, a chemical factory, and a food factory as using a nitrification liquid circulation method, an endogenous denitrification method, or the like.

In the nitrification liquid circulation method described above, first, ammoniacal nitrogen in the sewage (raw water) to be treated is converted into nitrite nitrogen or nitrate nitrogen under aerobic conditions by nitrifying bacteria. Thereafter, nitrite nitrogen or nitrate nitrogen is reduced to nitrogen gas by denitrification bacteria under anoxic conditions using organic substances as reducing power. The sewage is subjected to repeated nitrification and denitrification by circulating the sewage in an aerobic tank (nitrification tank) and an anoxic tank (denitrification tank), whereby the sewage is subjected to biological treatment.

Further, when phosphorus is contained in the sewage, phosphorus is removed by phosphorus removing bacteria. The phosphorus removing bacteria take organic substances in the sewage into cells thereof under anaerobic conditions and discharge phosphorus accumulated in the cells into the sewage. When the phosphorus removing bacteria in this state are exposed under aerobic conditions, organic substances accumulated in the cells are used as a nutrient source for propagation, the phosphorus in the sewage is excessively ingested, and the phosphorus is re-accumulated in the cells, whereby the phosphorus in the sewage is removed.

Further, in the sewage treatment facility 60, water sprinkled over a deodorizing unit (described later) in the microorganism deodorizing device 1A and dropped into a water storage tank merges with the sewage in the sewage pipe 210 through a return pipe 240, and when the water is acidic water, the water is neutralized using, for example, alkaline water or the like.

In the sewage treatment facility 60, an example of treating sewage using, for example, the nitrification liquid circulation method and an example of treating acidic water discharged from the microorganism deodorizing device 1A have been described. However, any facility may be used as long as the facility can treat sewage, acidic water, and the like.

The exhaust pipe 200, the sewage pipe 210, and the treated water pipe 220 are formed of a material having pressure resistance and corrosion resistance, such as metal and vinyl chloride, and are pipes, tubes, hoses, or the like through which air or water can pass.

[Configuration of Microorganism Deodorizing Device]

As shown in FIG. 1, the microorganism deodorizing device 1A of the deodorization treatment system of the first embodiment is provided, in the middle of the exhaust pipe 200, with a blower 300 for forcibly feeding air from the facility 100 to the microorganism deodorizing device 1A, and a valve 400 for opening and closing the exhaust pipe 200.

The microorganism deodorizing device 1A shown in FIGS. 1 to 4 is formed as a large-sized device, for example, a substantially rectangular parallelepiped device having a size of about 10 meters in length and width and about 3 meters in height. However, the microorganism deodorizing device 1A may have any size and shape as long as air can be deodorized while a foam material 17 (described later) is held therein as a "microorganism holding carrier".

Figure 3:
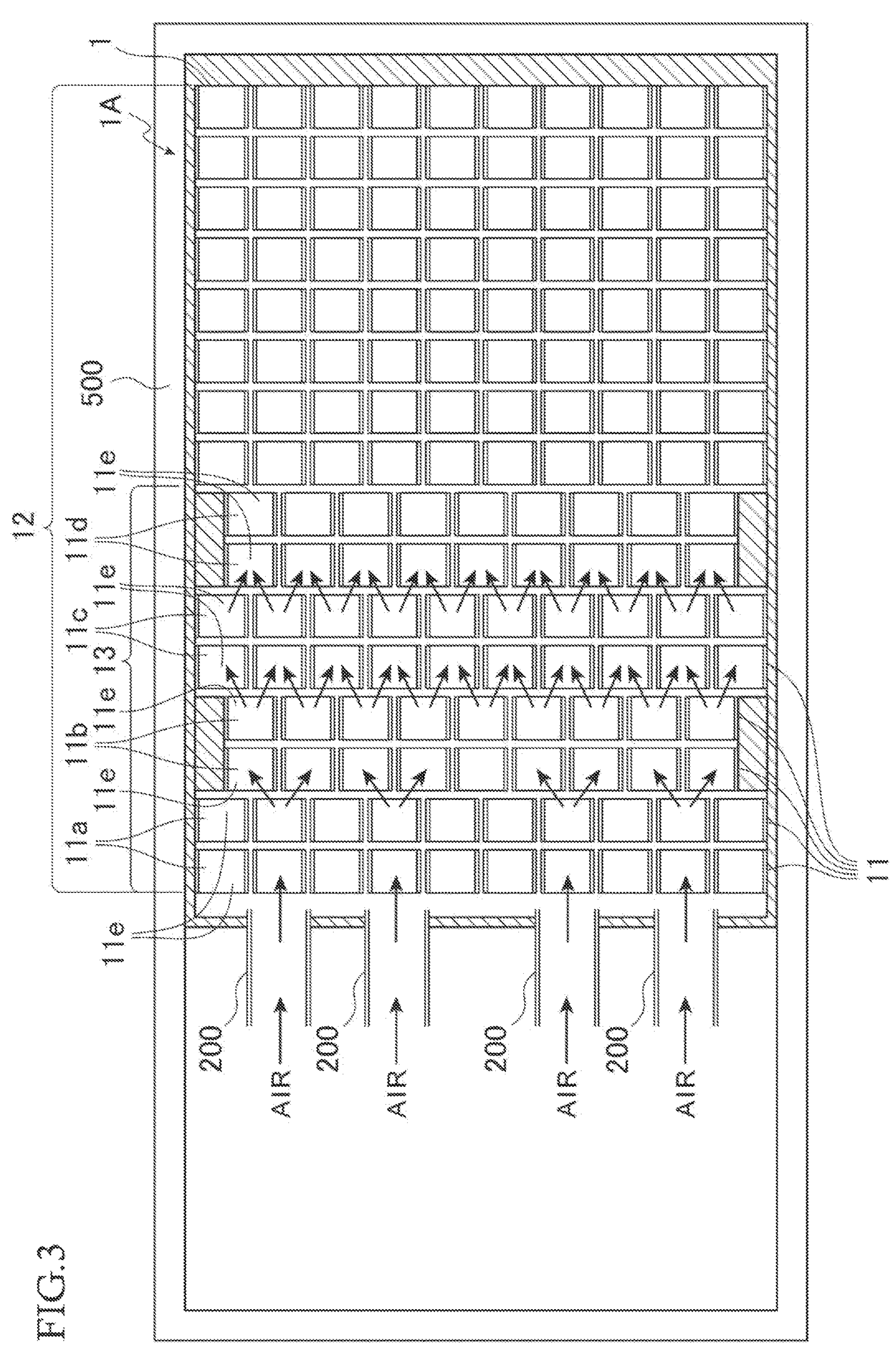
FIG. 3 is a sectional view schematically showing a state in which the microorganism deodorizing device of FIG. 1, which is accommodated in an accommodation unit, is cut at the position of a chamber unit.
Figure 4:
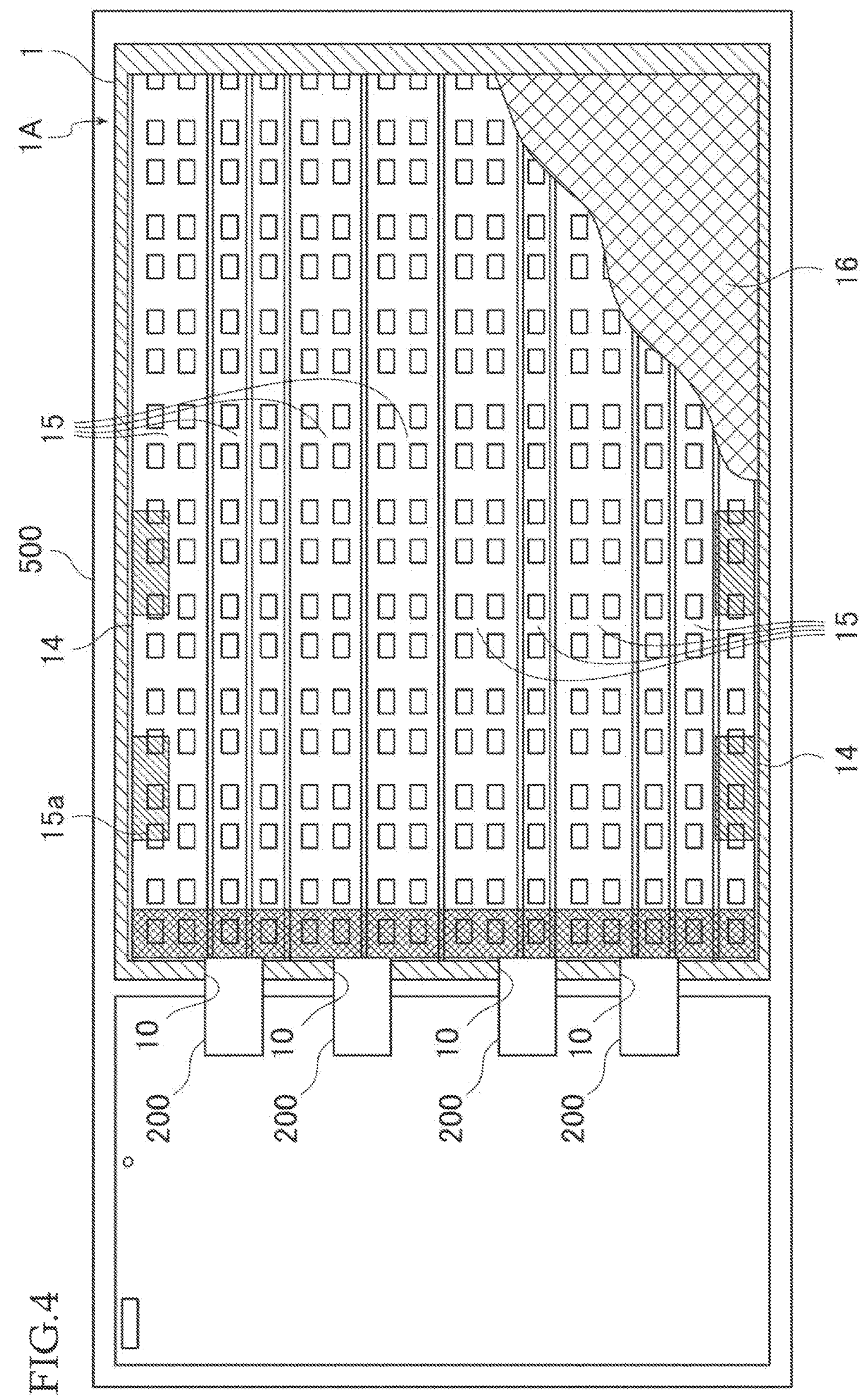
FIG. 4 is a sectional view schematically showing a state in which the microorganism deodorizing device of FIG. 1, which is accommodated in the accommodating unit, is cut at the position of a pallet and a fall prevention member.

As shown in FIGS. 3 and 4, the microorganism deodorizing device 1A is considered to be used by being accommodated in a box-shaped accommodation unit 500. The accommodation unit 500 accommodates an electric motor for driving the microorganism deodorizing device 1A, electric cables, various wirings, various pipes, and the like.

The microorganism deodorizing device 1A of the deodorization treatment system of the first embodiment shown in FIG. 1 includes a substantially rectangular parallelepiped deodorizing tank 1. The deodorizing tank 1 can hold the foam material 17 (described later) and the like therein, and is formed of a material having high pressure resistance and corrosion resistance, such as metal, hard resin, and reinforced concrete.

As shown in FIG. 1, the deodorizing tank 1 is provided with a water storage tank 2, a chamber unit 3, a ventilation resistance layer 4 as a "ventilation resistance portion", and a deodorizing unit 5 in this order from the lower side.

The water storage tank 2 is formed in a container shape in which the periphery is sealed. A pump 330 is installed inside the water storage tank 2, and the pump 330 is connected to the return pipe 240. By driving the pump 330, water in the water storage tank 2 flows into the sewage treatment facility 60 through the return pipe 240 and the sewage pipe 210.

In this case, water overflowing from the water storage tank 2 may be caused to flow into the sewage treatment facility 60 through the return pipe 240 and the sewage pipe 210. Alternatively, without providing the water storage tank 2, water having passed through the deodorizing unit 5, the ventilation resistance layer 4, and the chamber unit 3 may be directly discharged to the return pipe 240.

The chamber unit 3 is formed as a hollow chamber above the water storage tank 2 via a partition wall 9, and has a function of temporarily storing air fed into the deodorizing tank 1.

Figure 2:
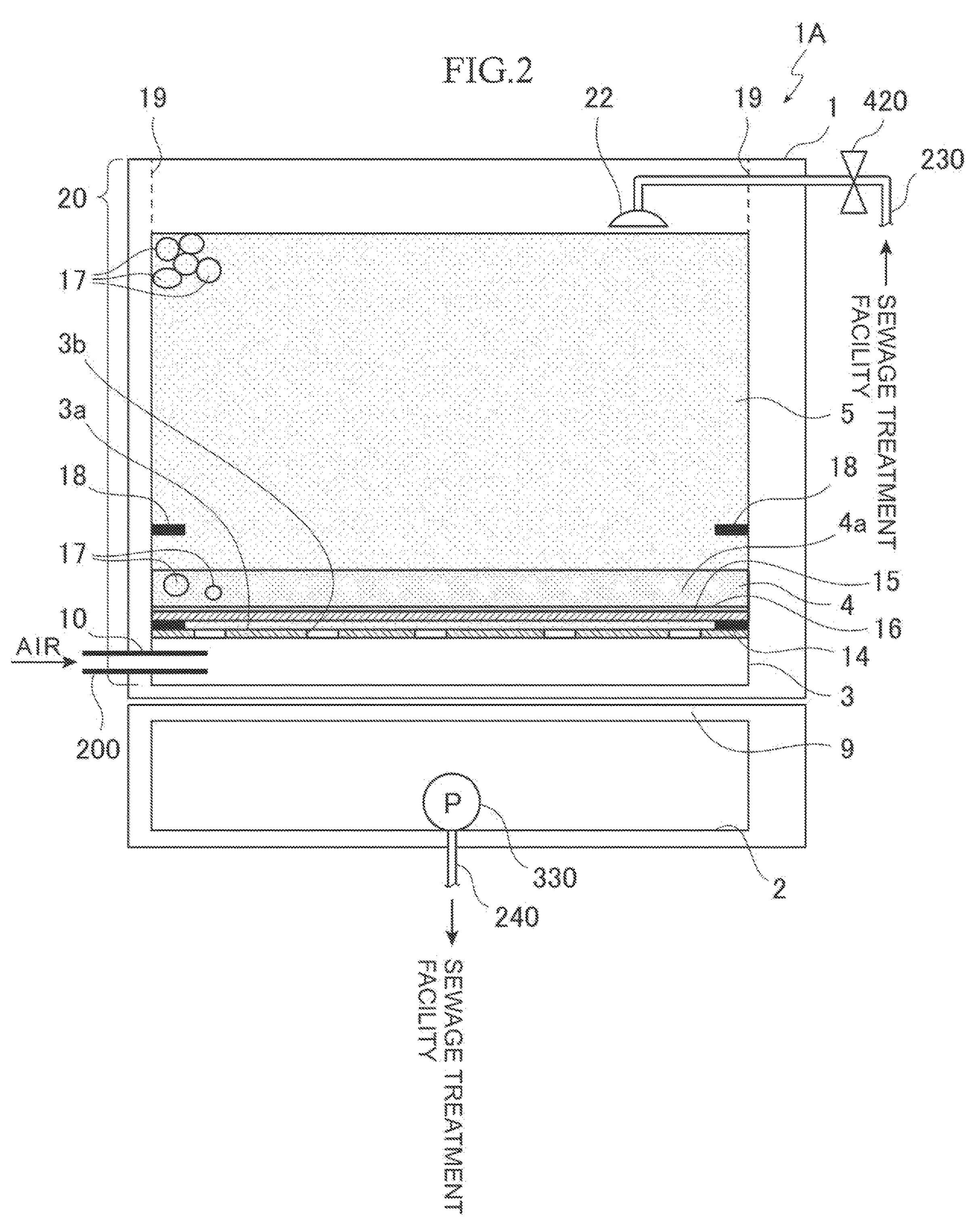
FIG. 2 is a sectional view schematically showing the configuration of a microorganism deodorizing device of FIG. 1.

As shown in FIG. 2, an insertion hole 10 serving as an "introduction portion" for introducing air into the chamber unit 3 is formed so as to penetrate a part of the chamber unit 3, and an exhaust pipe 200 for allowing air containing odor to flow into the chamber unit 3 is inserted through the insertion hole 10.

Further, as shown in FIG. 3, a plurality of U-shaped grooves 11 formed of a material having high rigidity and corrosion resistance, such as concrete and hard resin, are arranged in the chamber unit 3 to form a flow passage 12. The flow passage 12 forms a diffusion passage 13 that diffuses, in the horizontal direction (the planar direction in FIG. 3), the air flowing into the chamber unit 3 from the exhaust pipe 200 at a position close to the exhaust pipe 200.

Specifically, for example, as shown in FIG. 3, in the diffusion passage 13, opening portions 11*e*, 11*e* of first row U-shaped grooves 11*a*, 11*a* and opening portions 11*e*, 11*e* of second row U-shaped grooves 11*b*, 11*b* are arranged in a horizontally shifted state (in a vertically shifted state in FIG. 3). Similarly, the opening portions 11*e*, 11*e* of the second row U-shaped grooves 11*b*, 11*b* and opening portions 11*e*, 11*e* of third row U-shaped grooves 11*c*, 11*c* as well as the opening portions 11*e*, 11*e* of the third row U-shaped grooves 11*c*, 11*c* and opening portions 11*e*, 11*e* of fourth row U-shaped grooves 11*d*, 11*d* are also arranged in a horizontally shifted state. Thus, air passing through the diffusion passage 13 flowing as indicated by arrows in FIG. 3 flows inside the chamber unit 3 while being diffused in the horizontal direction. Here, the arrangement of the U-shaped grooves 11 in the diffusion passage 13 may be other than that shown in FIG. 3. Further, the U-shaped groove 11 of the diffusion passage 13 may be formed of a material other than the material described above.

As shown in FIG. 2, the partition wall 3*a* is provided on the upper side of the chamber unit 3. A ventilation hole 3*b* is formed as being opened in the partition wall 3*a*. Above the partition wall 3*a*, an installation protrusion 14 is projected inward from the inner wall of the deodorizing tank 1, and a pallet 15 is arranged above the installation protrusion 14 as shown in FIG. 4. The pallet 15 is formed of a material having high rigidity and corrosion resistance, such as hard resin, and is provided with a plurality of gap portions 15*a* in a lattice shape through which air flows.

As shown in FIG. 4, a fall prevention member 16 is arranged above the pallet 15. The fall prevention member 16 is formed of a material having flexibility and high corrosion resistance, such as soft resin, in a substantially mesh shape. The size of the mesh of the fall prevention member 16 is formed to such an extent that most of the foam material 17 can be held so as not to fall into the chamber unit 3 while allowing air to flow therethrough, for example, a size of about 2 millimeters in diameter. However, the mesh of the fall prevention member 16 may have any size provided that most of the foam material 17 is prevented from falling into the chamber unit 3. Although FIG. 4 shows a state in which the fall prevention member 16 is arranged on the upper side of only a part of the pallet 15 for simplification of illustration, the fall prevention member 16 is actually provided so as to cover the entire upper side of the pallet 15.

Due to the arrangement of the pallet 15 and the fall prevention member 16, it is possible to prevent the foam material 17 from falling into the chamber unit 3 while allowing the air flowing into the chamber unit 3 from the exhaust pipe 200 to flow to the ventilation resistance layer 4 and the deodorizing unit 5 above.

The ventilation resistance layer 4 is arranged above the pallet 15 and the fall prevention member 16. The ventilation resistance layer 4 is formed as a layer covering substantially the entire surface of the deodorizing unit 5 when viewed from the chamber unit 3 side having a predetermined width (e.g., several centimeters to several tens of centimeters) over substantially the entire area in the horizontal direction with a material (e.g., rock wool 4*a*) having ventilation resistance higher than that of the deodorizing unit 5 in which the foam material 17 is arranged.

Note that the ventilation resistance layer 4 may be formed of any material or substance other than the rock wool 4*a* as long as the material or substance has high ventilation resistance (e.g., a nonwoven fabric or a nonwoven fabric-like material). Further, in the first embodiment, the ventilation resistance layer 4 is arranged over substantially the entire area in the horizontal direction, but may be arranged at any position and in any shape as long as the ventilation resistance is high and the flow velocity of the air flowing into the deodorizing unit 5 can be reduced. For example, the ventilation resistance layer 4 may be arranged at a part in the horizontal direction, for example, only in substantially the central part in plan view, only at the peripheral part in plan view, or only on the side where the exhaust pipe 200 is arranged in plan view, or the ventilation resistance layer 4 may be arranged above the deodorizing unit 5.

As shown in FIGS. 1 and 2, in the first embodiment, the rock wool 4*a* and the foam material 17 configuring the deodorizing unit 5 are mixed in the ventilation resistance layer 4. This is to prevent the ventilation resistance layer 4 formed of only the rock wool 4*a* from changing over time and becoming excessively large in ventilation resistance. However, the ventilation resistance layer 4 may be configured in a manner that the foam material 17 is not mixed.

As shown in FIGS. 1 and 2, the deodorizing unit 5 is arranged above the ventilation resistance layer 4 as being in contact with the ventilation resistance layer 4. The deodorizing unit 5 is filled with many pieces of the foam material 17 and formed in a layer shape having a predetermined thickness (e.g., a thickness of about 1 to 3 meters, but may be thicker or thinner). Although FIGS. 1 and 2 show the foam material 17 only in a part of the deodorizing unit 5 for simplification, the foam material 17 is actually filled in substantially the entire area of the deodorizing unit 5.

The individual foam material 17 configuring the deodorizing unit 5 is a porous material having a diameter of, for example, about 5 millimeters to several tens of millimeters. The diameter of the individual pores (not shown) of the foam material 17 may be in the order of a few micrometers to tens of micrometers. A large number of microorganisms (e.g., nitrification bacteria and nitrite bacteria which decompose ammonia, sulfur bacteria which decompose hydrogen sulfide, and the like) having a deodorization effect ((e.g., microorganisms which biodegrade a chemical substance (e.g., ammonia, hydrogen sulfide, and the like being sources of malodor)) can live in individual pores (not shown) of the foam material 17.

The foam material 17 of this embodiment is formed by, for example, baking and foaming recycled glass using a glass bottle as a main raw material, and has a surface area of about 80 square meters per gram. Thus, the foam material 17 can be formed at low cost, in which a large amount of microorganisms can live in a small volume and a high deodorization effect can be obtained. Further, the foam material 17 has a low ventilation resistance. Accordingly, the blowing resistance of the blower 300 is prevented from becoming excessive, and the electrical charges for driving the blower 300 can be reduced.

The foam material 17 of this embodiment is formed by baking recycled glass as described above. By configuring the foam material 17 in this manner, it is possible to suppress the possibility of aging deteriorations due to corrosive properties to gases such as ammonia and hydrogen sulfide as in the case where the foam material is formed of concrete (see Patent Document 1 above), and it is possible to suppress the possibility of aging deteriorations due to microorganism decomposition as in the case where the foam material is formed of organic substances such as wood chips.

Note that, although it is desirable that the foam material 17 is formed of a material which is inexpensive and has a large surface area, it may be formed of any member (e.g., wood, ceramic, or the like) as long as the member functions as the foam material 17.

A ventilation resistance protrusion 18 serving as a "ventilation resistance portion" protrudes from the inner wall of the deodorizing tank 1 as being located in the deodorizing unit 5. The ventilation resistance protrusion 18 is arranged in substantially the entire area of the inner wall of the deodorizing tank 1 where the flow velocity of air tends to increase inside the deodorizing tank 1. Here, the ventilation resistance protrusion 18 may be arranged at any position and in any manner as long as it reduces the flow velocity of the air flowing from the lower side to the upper side of the deodorizing tank 1. For example, the ventilation resistance protrusion 18 may be arranged only in the vicinity of the position where the exhaust pipe 200 is arranged in plan view.

An opening portion 19 is formed above the deodorizing unit 5 in the deodorizing tank 1. The inside of the deodorizing tank 1 forms an airflow passage 20 through which air passes from the lower side (chamber unit 3 side) as "one side" to the upper side (opening portion 19 side) as "the other side". That is, in the airflow passage 20 inside the deodorizing tank 1, air passes from the lower side to the upper side as shown by arrows in FIG. 1. Here, "one side" and "the other side" of the airflow passage 20 may be at any positions. For example, "one side" may be above the deodorizing tank 1 and "the other side" may be below the deodorizing tank 1, or "one side" may be one side surface of the deodorizing tank 1 and "the other side" may be the other side surface of the deodorizing tank 1.

[Configuration of Water Sprinkling Unit]

The water sprinkling unit 70 includes a bypass pipe 230 having one end connected to the treated water pipe 220, a water sprinkling unit 22 attached to the other end of the bypass pipe 230, the pump 330 installed in the water storage tank 2, and a return pipe 240 having one end connected to the pump 330 and the other end connected to the sewage pipe 210.

The bypass pipe 230 is provided with a pump 320 for supplying the treated water treated by the sewage treatment facility 60 to the microorganism deodorizing device 1A, and an on-off valve 420 for opening and closing.

The water sprinkling unit 22 is installed above the deodorizing unit 5 in the deodorizing tank 1. The water sprinkling unit 22 is configured as a sprayer, and drops the water flowing through the bypass pipe 230 from above the deodorizing unit 5 in a mist form to the deodorizing unit 5. Here, the water sprinkling unit 22 may be of any form as long as water is dropped to the deodorizing unit 5, and for example, the water sprinkling unit 22 may be formed as one or a plurality of small hole portions opened to the other end of the bypass pipe 230.

The return pipe 240 is provided with an on-off valve 430 for opening and closing. Due to driving of the pump 330, the return pipe 240 can sprinkle water to the deodorizing unit 5 in the microorganism deodorizing device 1A and allow the water dropped into the water storage tank 2 to flow into the sewage treatment facility 60.

[Usage Mode of Microorganism Deodorizing Device]

Next, description will be provided on a usage mode of the microorganism deodorizing device 1A of the deodorization treatment system of the first embodiment.

In the first embodiment, when the valve 400 is opened as described above, the air containing malodor generated at the facility 100 is fed to the chamber unit 3 of the microorganism deodorizing device 1A through the exhaust pipe 200 by the blowing of the blower 300.

As shown in FIG. 2, the ventilation resistance layer 4 is located above the chamber unit 3 via the partition wall 3*a* in which the ventilation hole 3*b* is formed, and the air flowing into the chamber unit 3 is inhibited from immediately flowing upward by the magnitude of the ventilation resistance of the ventilation resistance layer 4, so that the air flowing into the chamber unit 3 passes through the flow passage 12 of the U-shaped grooves 11 including the diffusion passage 13 shown in FIG. 3 and is diffused in the horizontal direction inside the chamber unit 3.

Then, the air diffused to the entire area of the chamber unit 3 flows upward through the ventilation hole 3*b*. At this time, since the ventilation resistance of the ventilation resistance layer 4 is high, the flow of the air is suppressed in the ventilation resistance layer 4, and the upward flow velocity of the air becomes slow. Accordingly, the air slowly flows upward, passes through the ventilation resistance layer 4, reaches the deodorizing unit 5, and then flows upward slowly in the deodorizing unit 5. Therefore, the stay time of the air in the deodorizing unit 5 becomes long, and a high deodorization effect is obtained.

When the air having reached the deodorizing unit 5 comes into contact with the foam material 17, malodor components contained in the air are decomposed by the microorganisms fixed and living in the foam material 17, and the malodor components are removed. Here, the air flowing into the chamber unit 3 from the exhaust pipe 200 is diffused over substantially the entire area in the horizontal direction in the chamber unit 3, flows upward, and reaches the deodorizing unit 5, so that the air comes into contact with the foam material 17 over substantially the entire area in the horizontal direction of the deodorizing unit 5. In other words, in the deodorizing unit 5, the air comes into contact with many pieces of the foam material 17, and a high deodorization effect can be obtained.

Further, in the deodorizing unit 5, since the ventilation resistance protrusion 18 inhibits the flow of the air over substantially the entire inner wall of the deodorizing tank 1 where the air is easy to flow, reduction of the deodorization effect due to increase of the flow velocity of the air in the vicinity of the inner wall of the deodorizing tank 1 is suppressed. Thus, the air is allowed to flow slowly in substantially the entire area of the deodorizing unit 5, and a high deodorization effect can be obtained.

Then, the air having passed through the deodorizing unit 5 and having malodor components decomposed and deodorized by the microorganisms in the foam material 17 is discharged to the outside from the opening portion 19 at the upper part of the deodorizing tank 1. In this way, the microorganism deodorizing device 1A of the first embodiment removes malodor components of the air containing malodor and discharges the deodorized air to the outside.

On the other hand, a portion of the treated water flowing into the bypass pipe 230 is sprinkled into the deodorizing tank 1 from the water sprinkling unit 22. The sprinkled water is dropped to the inside of the deodorizing tank 1 and is used for growing microorganisms living in the foam material 17 in the deodorizing unit 5 and the ventilation resistance layer 4.

The water dropped further from the deodorizing unit 5 and the ventilation resistance layer 4 is dropped into the chamber unit 3, and further dropped into the water storage tank 2 from the chamber unit 3 to be stored in the water storage tank 2. It is desirable to change the amount of water sprinkled from the water sprinkling unit 22 into the deodorizing tank 1 and the frequency of water sprinkling in accordance with the temperature and the like to promote the growth and activity of the microorganisms fixed and living in the foam material 17. For example, in summer when the temperature is high, it is desirable to increase the number of times of water sprinkling from the water sprinkling unit 22 to the inside of the deodorizing tank 1 and the amount of water sprinkling each time.

[Effects]

As described above, the microorganism deodorizing device 1A of the deodorization treatment system 50 of the first embodiment includes the ventilation resistance layer 4 to increase the ventilation resistance of the air flowing through the airflow passage 20, the chamber unit 3 arranged close to or adjacent to the deodorizing unit 5 and/or the ventilation resistance layer 4 as a chamber to temporarily store the air fed into the deodorizing tank 1. As a result of that the ventilation resistance of flow of the air flowing through the airflow passage 20 is increased by the ventilation resistance layer 4, the air is fed to the deodorizing unit 5 in a state of being spread in the chamber unit 3 over the substantially entire surface of the deodorizing unit 5. Accordingly, the air fed into the deodorizing tank 1 is fed to the deodorizing unit 5 in a state of being diffused over substantially the entire chamber unit 3 and the air containing odor becomes easily in contact with the foam material 17 in the entire deodorizing unit 5. Therefore, even without performing forcible stirring of air in the deodorizing tank 1 by an air stirring device or the like, odor is decomposed and deodorized by the microorganisms in the entire area of the deodorizing unit 5, and highly efficient deodorization can be performed. Accordingly, even in a large-scale device including the large-sized deodorizing tank 1, it is possible to sufficiently exhibit a decomposition-deodorization function while suppressing an increase in manufacturing cost.

In the microorganism deodorizing device 1A of the deodorization treatment system 50 of the first embodiment, the ventilation resistance layer 4 is formed as a ventilation resistance layer which is arranged as facing a flow direction of the air in the airflow passage 20 and which covers a substantially entire surface of the airflow passage 20. As a result of that easy air flow is disturbed over the entire airflow passage 20, the air containing odor fed to the deodorizing tank 1 is easily spread over the entire area of the deodorizing unit 5, and the flow velocity of the air flowing through the deodorizing tank 1 is suppressed, so that the air containing odor can be in contact with the foam material 17 over the entire area of the deodorizing unit 5 for a long time. Therefore, even in a large-scale device including the large deodorizing tank 1, the odor can be efficiently decomposed and deodorized by the microorganisms in the entire area of the deodorizing unit 5.

In the microorganism deodorizing device 1A of the deodorization treatment system 50 of the first embodiment, by forming the ventilation resistance layer 4 by a nonwoven fabric-like material, it is also possible to prevent dust mixed with malodor from flowing into the deodorizing unit 5 and the pores of the foam material 17 arranged in the deodorizing unit 5 from being blocked.

In the microorganism deodorizing device 1A of the deodorization treatment system 50 of the first embodiment, the ventilation resistance layer 4 includes, in addition to the ventilation resistance layer 4, the ventilation resistance protrusion 18 protruding inward from the wall surface of the inner peripheral portion of the deodorizing tank 1, thereby further enhancing the function of suppressing the flow of air in the vicinity of the wall surface portion inside the deodorizing tank 1 through which air easily flows, and as a result, the air containing odor fed to the deodorizing tank 1 is more easily spread over the entire deodorizing tank 1 as staying inside the deodorizing tank 1. Accordingly, even in a large-scale device including a large-sized deodorizing tank, it is possible to exhibit a higher decomposition-deodorization function while suppressing an increase in manufacturing cost.

In the microorganism deodorizing device 1A of the deodorization treatment system 50 of the first embodiment, the chamber unit 3 is arranged below the deodorizing unit 5 in the deodorizing tank 1, the airflow passage 20 is configured to allow air to flow upward from below the deodorizing tank 1, and the chamber unit 3 is provided with the insertion hole 10 for introducing air into the chamber unit 3, and the diffusion passage 13 as the flow passage 12 for horizontally diffusing air flowing in from the insertion hole 10, so that the air introduced from the insertion hole 10 can be diffused in the horizontal direction in the chamber unit 3 and fed into the deodorizing unit 5. This makes it easier for the air containing odor to be spread over the entire area of the deodorizing tank 1. Accordingly, even in a large-scale device including a large-sized deodorizing tank, it is possible to exhibit a higher decomposition-deodorization function while suppressing an increase in manufacturing cost.

In the microorganism deodorizing device 1A of the deodorization treatment system 50 of the first embodiment, since the diffusion passage 13 is formed by the plurality of U-shaped grooves 11, it is possible to form the diffusion passage 13 at low cost and to easily form a configuration in which air fed from the insertion hole 10 is diffused in the horizontal direction in the chamber unit 3.

In the microorganism deodorizing device 1A of the deodorization treatment system 50 of the present embodiment, since the substantially mesh-shaped fall prevention member 16 for preventing the foam material 17 from falling into the chamber unit 3 is provided on the upper side of the chamber unit 3, it is possible to reliably prevent, with a simple configuration, a situation in which the foam material 17 falls into the chamber unit 3 to block the airflow passage 20 in the chamber unit 3 and air containing odor is not spread to the deodorizing tank 1.

[Usage Mode of Sprinkling Unit]

The sewage generated at the facility 100 is fed to the sewage treatment facility 60 through the sewage pipe 210 by opening the on-off valve 410 and driving the pump 310.

The sewage fed to the sewage treatment facility 60 is purified, and discharged from the treated water pipe 220 as treated water. By opening the on-off valve 420 and driving the pump 320, a portion of the treated water passes through the bypass pipe 230 and is dropped from above the deodorizing unit 5 to the deodorizing unit 5 in a mist form. The water dropped into the deodorizing unit 5 is used for promoting the growth and activity of microorganisms living in the foam material 17 in the deodorizing unit 5 and the ventilation resistance layer 4.

The water dropped further from the deodorizing unit 5 and the ventilation resistance layer 4 is dropped into the chamber unit 3, and further dropped into the water storage tank 2 from the chamber unit 3 to be stored in the water storage tank 2. The water stored in the water storage tank 2 merges with the sewage flowing in the sewage pipe 210 through the return pipe 240 by opening the on-off valve 430 and driving the pump 330, and flows into the sewage treatment facility 60.

Here, in the case where the odor components fed into the microorganism deodorizing device 1A has a high concentration of sulfur-based odor such as hydrogen sulfide and methyl sulfide, the microorganisms decompose the sulfur compounds to generate sulfuric acid because sulfur bacteria are mainly fixed to the microorganisms for deodorization. Therefore, when the circulating water system described in Patent Document 1 described above is adopted, the concentration of sulfuric acid in the circulating water increases every time water is circulated, and the hydrogen ion concentration of the circulating water decreases to around pH=1, so that microorganisms cannot live.

In the present embodiment, since the treated water of the sewage treatment facility 60 is guided to the microorganism deodorizing device 1A and sprinkled to the microorganisms in the microorganism holding carrier by the water sprinkling unit 70, and the water having sprinkled and passed through the microorganism deodorizing device 1A is returned to the inflow side of the sewage treatment facility 60, it is possible to prevent the microorganisms from being adversely affected by continuing to circulate the water flowing in the microorganism deodorizing device 1A.

[Effects]

As described above, in the deodorization treatment system of the first embodiment, the treated water of the sewage treatment facility 60 is guided to the microorganism deodorizing device 1A and sprinkled to the microorganisms in the microorganism holding carrier by the water sprinkling unit 70, and the water having sprinkled and passed through the microorganism deodorizing device 1A is returned to the inflow side of the sewage treatment facility 60. Accordingly, it is possible to prevent the microorganisms from being adversely affected by continuing to circulate the water flowing in the microorganism deodorizing device 1A, to continue deodorization, and to reduce the amount of water used.

Further, since the treated water discharged to the treated water pipe 220 of the sewage treatment facility 60 is used as the water flowing in the microorganism deodorizing device 1A, the water temperature is not high, and air flowing in the microorganism deodorizing device 1A is cooled to maintain the reaction temperature range of the microorganisms, so that the decomposition-deodorization function by the microorganisms can be sufficiently exhibited.

Second Embodiment

Figure 5:
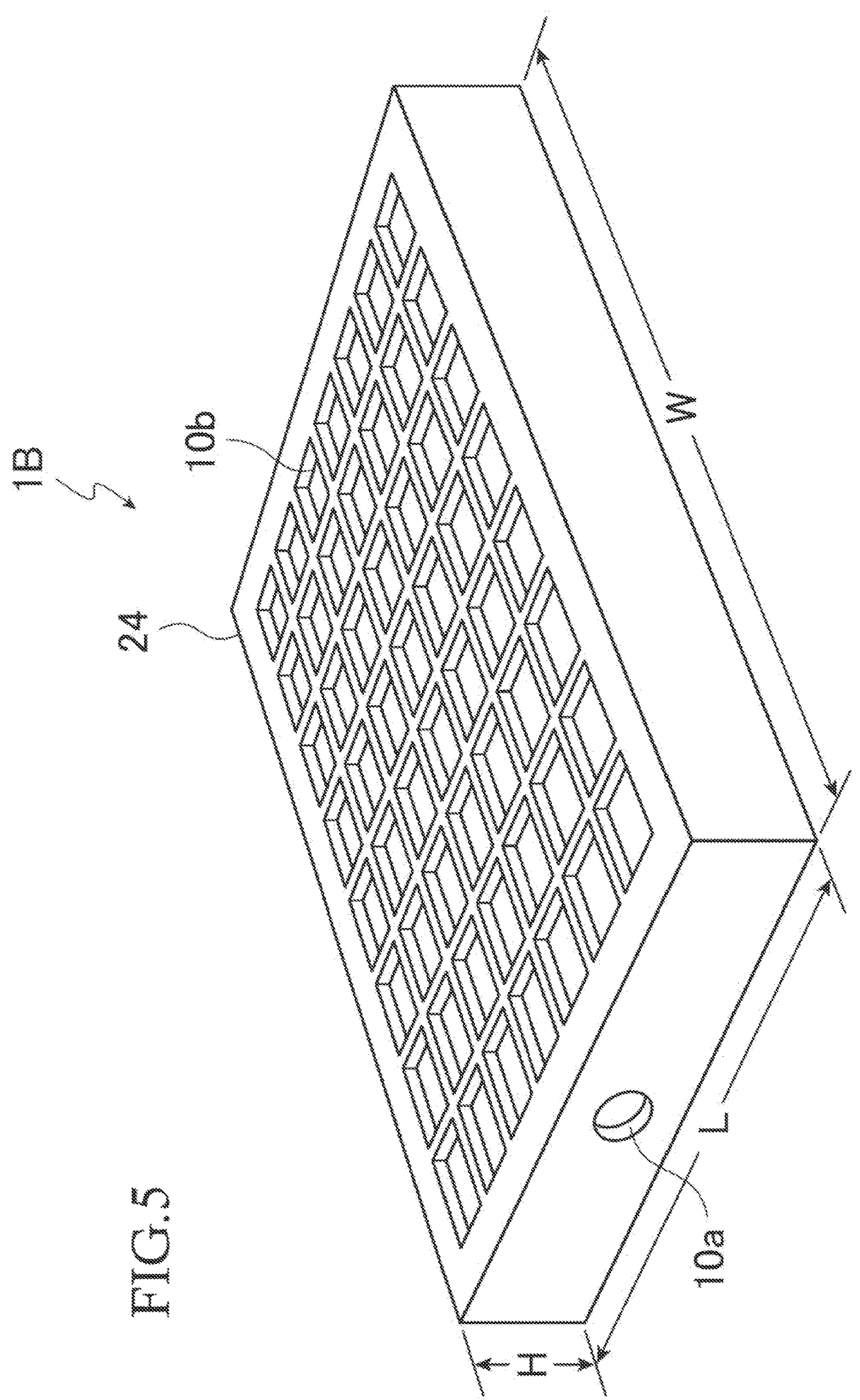
FIG. 5 is a view schematically showing a distribution housing used in the microorganism deodorizing device of the deodorization treatment system according to a second embodiment.

FIG. 5 is a view schematically showing a part of the configuration (i.e., a component) of a microorganism deodorizing device 1B of the deodorization treatment system 50 according to a second embodiment.

In the second embodiment, instead of the partition wall 3*a*, the installation protrusion 14, and the pallet 15 of the microorganism deodorizing device 1A of the deodorization treatment system 50 of the first embodiment, a distribution housing 24 as schematically shown in FIG. 5 is arranged in the chamber unit 3.

The distribution housing 24 has both the functions of the chamber unit 3 and the pallet 15 of the microorganism deodorizing device 1A of the deodorization treatment system 50 of the first embodiment. That is, the distribution housing 24 has a function of diffusing, in the horizontal direction, the air flowing into the chamber unit 3 from the exhaust pipe 200 and a function of preventing the foam material 17 from falling into the chamber unit 3 while providing ventilation from the chamber unit 3 to the ventilation resistance layer 4 and the deodorizing unit 5.

The distribution housing 24 is formed in a substantially box shape by a material capable of maintaining a specific shape, for example, a molded product made of hard resin or the like. Here, the distribution housing 24 may be formed of any material other than resin, such as wood and cardboard, as long as the specific shape can be maintained.

The distribution housing 24 of the present embodiment shown in FIG. 5 has a longitudinal size L, a lateral size W, and a height H that are substantially the same as a longitudinal size L, a lateral size W, and a height H of the interior of the chamber unit 3, and is formed so as to be accommodated in the chamber unit 3 substantially without a gap. As shown in FIG. 5, an insertion hole portion 10*a* is formed in the distribution housing 24 at a position corresponding to the insertion hole 10 of the chamber unit 3. A large number of mesh-like opening portions 10*b* are formed on the upper side of the distribution housing 24. The opening portions 10*b* are opened to such a size that most of the foam material 17 does not fall.

Although not shown in FIG. 5, a flow passage (not shown) similar to the flow passage 12 (see FIG. 3) including the diffusion passage 13 of the chamber unit 3 of the first embodiment is formed inside the distribution housing 24 by resin molding or the like, and air flowing into the chamber unit 3 from the exhaust pipe 200 is diffused in the horizontal direction by the flow passage (not shown).

Since the configuration of the microorganism deodorizing device 1B other than the above is the same as that of the microorganism deodorizing device 1A of the first embodiment, description thereof will be omitted.

In the second embodiment, the distribution housing 24 formed of resin or the like is arranged in the chamber unit 3 and the air flowing from the exhaust pipe 200 into the chamber unit 3 is diffused in the horizontal direction by the flow passage (not shown) in the distribution housing 24. Accordingly, it is possible to form the configuration to diffuse the air fed from the insertion hole portion 10*a* in the horizontal direction in the chamber unit 3 and feed the air to the deodorizing unit 5 and the configuration to prevent the foam material 17 from falling while providing ventilation from the chamber unit 3 to the ventilation resistance layer 4 and the deodorizing unit 5 in a light and highly rigid state at low cost.

Third Embodiment

Figure 6:
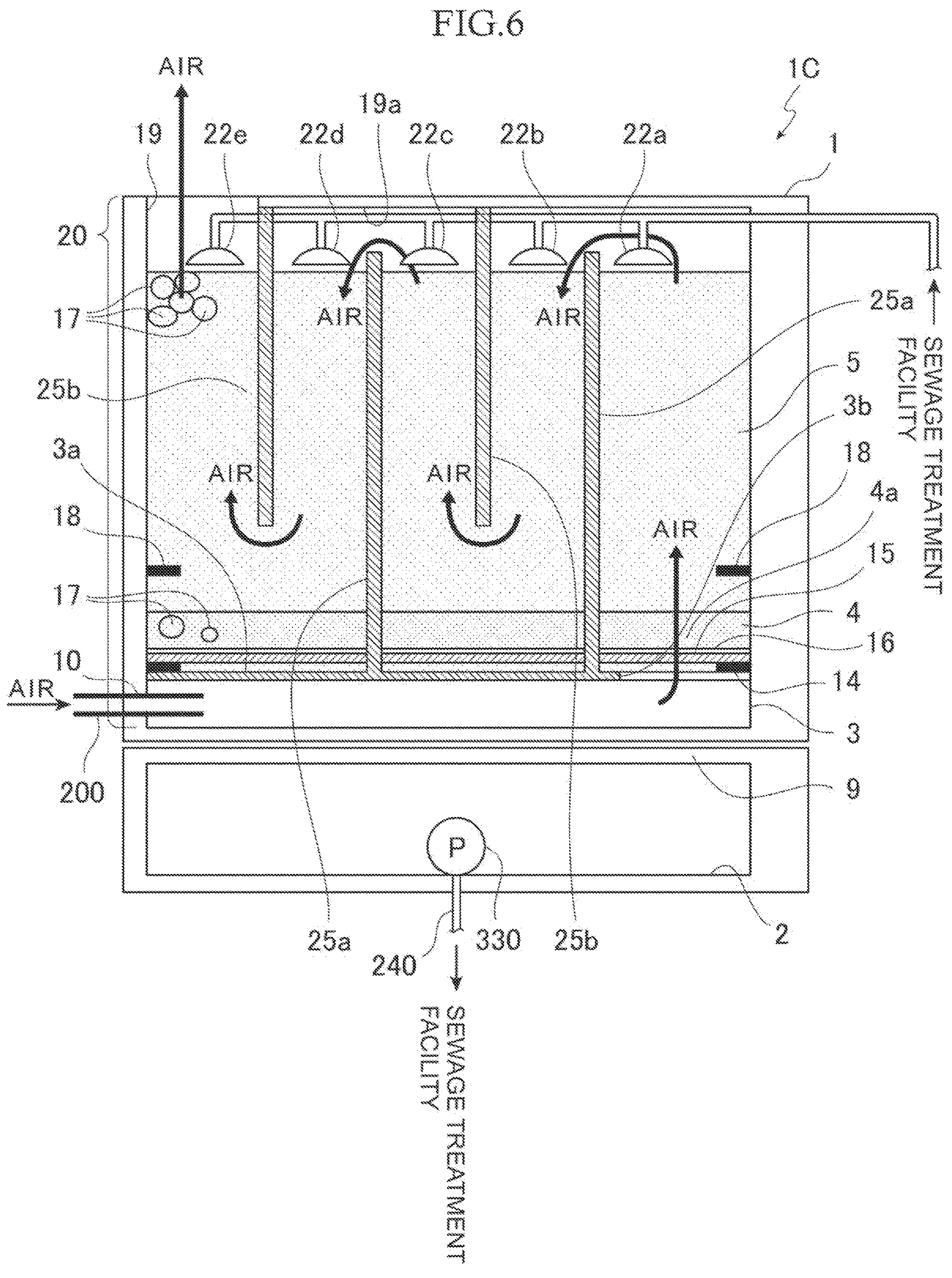
FIG. 6 is a sectional view schematically showing the configuration of the microorganism deodorizing device of the deodorization treatment system according to a third embodiment.

FIG. 6 is a diagram schematically showing the configuration of a microorganism deodorizing device 1C of the deodorization treatment system 50 according to the third embodiment.

In the third embodiment, the airflow passage 20 in the deodorizing unit 5 and the ventilation resistance layer 4 is formed in a labyrinth shape (zigzag shape) as schematically shown in FIG. 6.

Specifically, in the deodorizing unit 5 and the ventilation resistance layer 4 of the third embodiment, a lower protrusion 25*a* protruding upward from the lower side and an upper protrusion 25*b* protruding downward from the upper side are alternately arranged in the horizontal direction in side view. As shown in FIG. 6, in the third embodiment, the lower protrusions 25*a* protrude upward from the partition wall 3*a*. Further, a plate-shaped ceiling portion 19*a* is arranged from one side to the other side above the deodorizing tank 1, and the opening portion 19 is opened on the other side of the deodorizing tank 1 with respect to the ceiling portion 19*a*.

In the third embodiment, instead of the water sprinkling unit 22 of the first embodiment, a plurality of, for example, five water sprinkling units 22*a*, 22*b*, 22*c*, 22*d*, 22*e* are arranged at the gaps each between the lower protrusion 25*a* and the upper protrusion 25*b*. However, the number of the water sprinkling units 22*a*, 22*b*, 22*c*, 22*d*, 22*e* does not necessarily coincide with the number of gaps each between the lower protrusion 25*a* and the upper protrusion 25*b*, and the positions and number of the water sprinkling units 22*a*, 22*b*, 22*c*, 22*d*, 22*e* may be arbitrary set as long as the positions and number are sufficient to sprinkle water enough to allow the microorganisms to live in the foam material 17 arranged in the deodorizing unit 5 and the ventilation resistance layer 4.

Since the configuration of the microorganism deodorizing device 1C other than the above is the same as that of the microorganism deodorizing device 1A of the first embodiment, description thereof will be omitted.

In the third embodiment, the air flowing into the ventilation resistance layer 4 and the deodorizing unit 5 from the ventilation hole 3*b* through the chamber unit 3 flows through the ventilation resistance layer 4 and the deodorizing unit 5 along the formed airflow passage 20 along a passage indicated by arrows in FIG. 6. Specifically, the air flowing into the ventilation resistance layer 4 and the deodorizing unit 5 from the ventilation hole 3*b* proceeds from one side to the other side (from the right side to the left side in FIG. 6) while changing the course in the vertical direction from bottom to top and from top to bottom, and is discharged to the outside from the opening portion 19.

In the microorganism deodorizing device 1C of the deodorization treatment system of the third embodiment, since the airflow passage 20 of the ventilation resistance layer 4 and the deodorizing unit 5 is formed in a labyrinth shape by the lower protrusions 25*a*, the upper protrusions 25*b*, the partition wall 3*a*, and the ceiling portion 19*a*, the moving distance of the air in the ventilation resistance layer 4 and the deodorizing unit 5 is longer than that in the configuration in which the lower protrusion 25*a*, the upper protrusion 25*b*, and the ceiling portion 19*a* are not provided as in the first embodiment. Therefore, in the ventilation resistance layer 4 and the deodorizing unit 5, the amount of the air to be in contact with the foam material 17 (and the microorganisms living in the foam material 17) is increased. Therefore, a higher deodorization effect can be obtained in the ventilation resistance layer 4 and the deodorizing unit 5.

In the third embodiment, since water sprinkling is performed on the deodorizing unit 5 and the ventilation resistance layer 4 by the water sprinkling units 22*a*, 22*b*, 22*c*, 22*d*, 22*e* arranged at the gaps each between the lower protrusion 25*a* and the upper protrusion 25*b*, water is sprinkled to the foam material 17 of the deodorizing unit 5 and the ventilation resistance layer 4 without being disturbed by the lower protrusions 25*a* and the upper protrusions 25*b*, and the growth of the microorganisms in the foam material 17 can be maintained.

In the third embodiment, the airflow passage 20 of the ventilation resistance layer 4 and the deodorizing unit 5 has a labyrinth shape by protruding the lower protrusions 25*a* upward from the partition wall 3*a* below the ventilation resistance layer 4. However, not limited thereto, for example, it is possible to configure such that the airflow passage 20 only at the deodorizing unit 5 has a labyrinth shape by protruding the lower protrusions 25*a* from the side wall surface at the position of the deodorizing unit 5 of the deodorizing tank 1.

Fourth Embodiment

Figure 7:
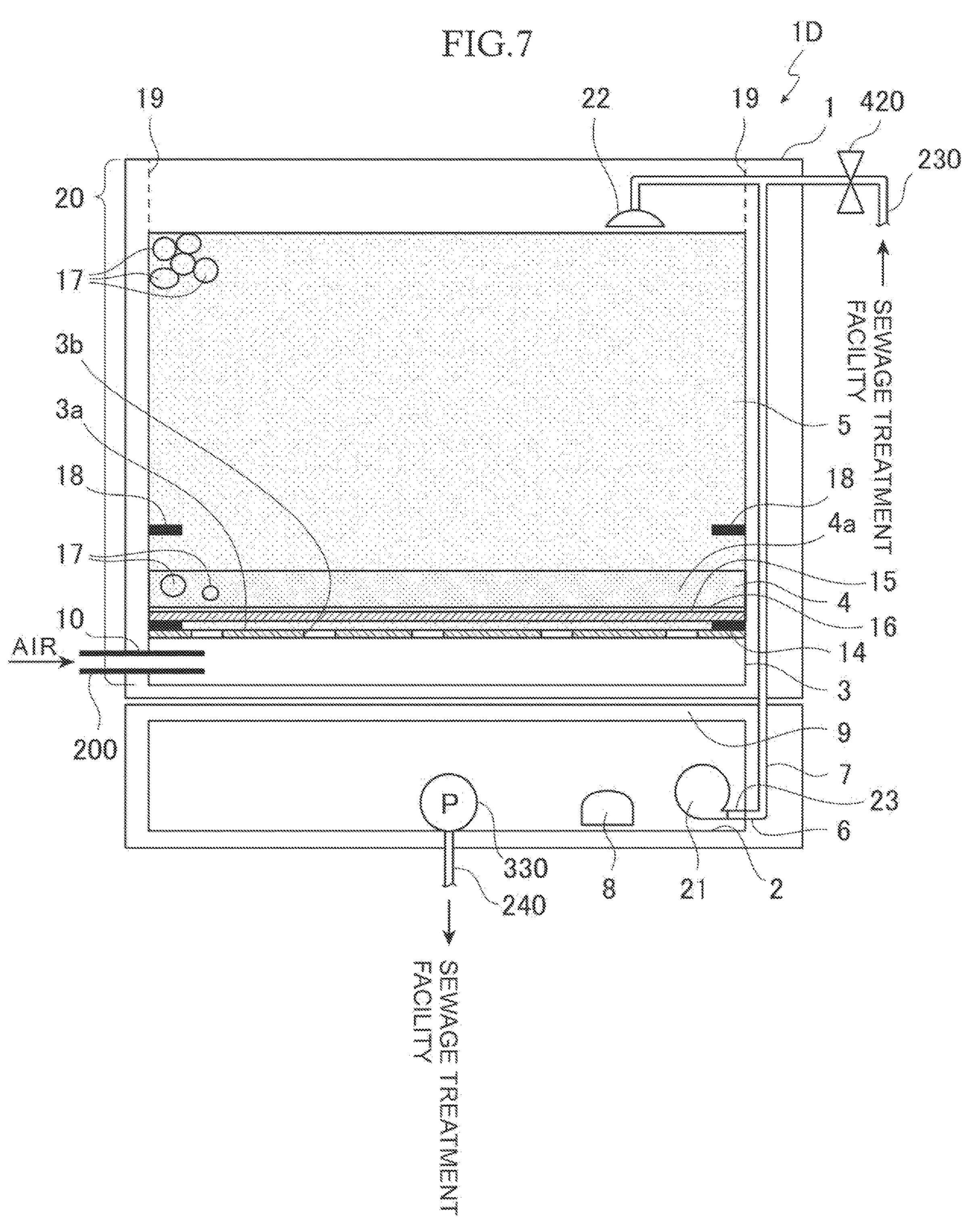
FIG. 7 is a sectional view schematically showing the configuration of the microorganism deodorizing device of the deodorization treatment system according to a fourth embodiment.

FIG. 7 is a diagram schematically showing the configuration of a microorganism deodorizing device 1D of the deodorization treatment system 50 according to the fourth embodiment.

The deodorizing tank 1 of the fourth embodiment is provided with a water sprinkling pipe 7. The water sprinkling pipe 7 is arranged along the wall surface of the deodorizing tank 1, in particular, along the deodorizing unit 5 in the deodorizing tank 1. Specifically, a pipe insertion hole 6 is formed at a part of the water storage tank 2, and a water sprinkling pipe 7 for allowing the water stored in the water storage tank 2 to flow is inserted to the pipe insertion hole 6.

The water sprinkling pipe 7 has one end side arranged in the water storage tank 2 and the other end side connected to the bypass pipe 230 arranged above the deodorizing tank 1. Further, as shown in FIG. 7, a pump 21 is arranged at a part of the water sprinkling pipe 7. The pump 21 is driven by an electric motor (not shown) and has a function to suck the water stored in the water storage tank 2 into the water sprinkling pipe 7 and to allow the water to flow upward from the lower side of the water sprinkling pipe 7. Then, the water sprinkling unit 22 is arranged on the other end side of the bypass pipe 230.

The water sprinkling unit 22 is formed as a sprayer and drops the water flowing through the water sprinkling pipe 7 and the treated water flowing through the bypass pipe 230 from above the deodorizing unit 5 in a mist form to the deodorizing unit 5. However, the water sprinkling unit 22 may have any configuration as long as water can be dropped to the deodorizing unit 5.

Further, the water sprinkling pipe 7 is provided with a mesh strainer 23. The strainer 23 has a function to filter, remove, and recover fine pieces of the foam material 17 flowing together with the water in the water sprinkling pipe 7.

A microbubble generator 8 is arranged in the water storage tank 2. The microbubble generator 8 generates fine air bubbles in the water in the water storage tank 2, and allows the water containing the bubbles to flow into the water sprinkling pipe 7.

The water flowing into the water sprinkling pipe 7 flows upward from the lower side and is sprinkled into the deodorizing tank 1 from the water sprinkling unit 22 as circulating in the water storage tank 2 or partially merging with the treated water flowing through the bypass pipe 230. The sprinkled water is dropped to the inside of the deodorizing tank 1 and is used for growing microorganisms living in the foam material 17 in the deodorizing unit 5 and the ventilation resistance layer 4.

Since the water sprinkled into the deodorizing tank 1 is water having a large air content, including fine air bubbles generated by the microbubble generator 8 in the water storage tank 2, it is possible to promote the growth and activity of microorganisms living in the foam material 17 and in the water stored in the water storage tank 2.

The water dropped further from the deodorizing unit 5 and the ventilation resistance layer 4 is dropped into the chamber unit 3, and further dropped into the water storage tank 2 from the chamber unit 3 to be stored again in the water storage tank 2. As described above, water can be circulated and used in the microorganism deodorizing device 1D.

Here, since the microorganisms living in the foam material 17 generate heat during activity, the deodorizing unit 5 and the ventilation resistance layer 4 in which the foam material 17 is arranged are in a heated state. Since the water sprinkling pipe 7 is arranged along the wall surface of the deodorizing tank 1, the water flowing in the water sprinkling pipe 7 is warmed by heat generated from the deodorizing unit 5 and the ventilation resistance layer 4. Therefore, even when the microorganism deodorizing device 1D is used in a cold place, freezing of the water flowing in the water sprinkling pipe 7 can be suppressed.

The fine pieces of the foam material 17 existing in the deodorizing unit 5 and the ventilation resistance layer 4 drop into the water storage tank 2 along with the drop of water and is precipitated in the water storage tank 2. The fine pieces of the foam material 17 precipitated in the water storage tank 2 are filtered and removed by the strainer 23 arranged in the water sprinkling pipe 7, and are recovered.

In the microorganism deodorizing device 1D of the deodorization treatment system 50 of the fourth embodiment, the water storage tank 2 storing the sprinkled water is provided below the deodorizing tank 1, and when the acidic concentration of the water is low, the water to be sprinkled to the deodorizing unit 5 can be used while being circulated. Then, when the acidic concentration of the water becomes high, the treated water purified by the sewage treatment facility 60 is allowed to flow in without constantly circulating water, and the acidic concentration can also be diluted.

Specifically, the pH value of the sprinkled water in the water storage tank 2 is constantly measured by a pH sensor, and when the pH value of the pH sensor drops below a preset threshold value, the pumps 320, 330 and the on-off valves 420, 430 are driven, so that the treated water purified by the sewage treatment facility 60 is allowed to flow in and the pH value can be maintained near neutral. Then, to execute the above control remotely and automatically, it is desirable to use the pumps 320, 330 and the on-off valves 420, 430 which are remotely operable.

Further, in the microorganism deodorizing device 1D of the deodorization treatment system 50 of the fourth embodiment, since the water sprinkling pipe 7 is arranged along the deodorizing tank 1, the water sprinkling pipe 7 through which the water to be sprinkled flows is naturally kept warm by heat generated by microorganisms in the deodorizing tank 1. Therefore, even when the microorganism deodorizing device 1D is used in a cold place, freezing of the water flowing in the water sprinkling pipe 7 can be suppressed easily and reliably.

Other Embodiments

Note that the first to fourth embodiments described above are examples of the present invention, and that the present invention is not limited only to the first to fourth embodiments.

In the deodorization treatment system 50 of each embodiment, when high-concentration and high-temperature ammonia gas is deodorized, in the glass deodorization method, the water sprinkling amount of the circulating water is greatly increased from the previous amount (several percent of the glass material filling amount), so that the exhaust gas temperature flowing through the deodorizing tank 1 can be cooled, and an excessive increase in the ammonia concentration in the circulating water can be suppressed.

In this case, since the urine treatment facility 60 serving as the sewage treatment facility is installed in a pig farm, water treated by the urine treatment facility 60 is used as the circulating water for deodorization, and a certain amount of the circulating water is intentionally overflowed from the water storage tank 2, as in the above-described embodiment.

Thus, the exhaust gas flowing in the deodorizing tank 1 can be cooled and the ammonia concentration of the water flowing in the deodorizing tank 1 can be prevented from rising excessively. Further, by overflowing the circulating water from the water storage tank 2, it is possible to prevent an increase in water temperature.

As described above, in both of the sulfur-based and high-concentration ammonia, the amount of water supplied to and discharged from the microorganism deodorizing device 1A, 1B, 1C, 1D and the urine treatment facility 60 is about 1 to 2 tons per day, and thus there is almost no environmental burden on the urine treatment facility 60.

Further, for example, in the deodorization treatment system 50 of the first embodiment, one end of the exhaust pipe may be connected to the sewage treatment facility 60, the other end of the exhaust pipe may be connected to the exhaust pipe 200, and a blower for forcibly blowing air of the sewage treatment facility 60 to the exhaust pipe 200 and a valve for opening and closing the exhaust pipe may be arranged in the middle of the exhaust pipe, so that air containing odor in the sewage treatment facility 60 is supplied to the exhaust pipe 200. With this configuration, air containing odor can be discharged from the inside of the sewage treatment facility 60.

In the deodorization treatment system 50 of each embodiment, the facility 100 is described as generating both sewage and air containing malodor, but not limited thereto, the present invention can also be applied to a configuration in which a facility generating sewage and a facility generating air containing malodor are separated.

INDUSTRIAL APPLICABILITY

The microorganism deodorizing device 1A, 1B, 1C, 1D of the deodorization treatment system 50 of each of the above embodiments is used in various fields for deodorizing air containing malodor.

For example, the microorganism deodorizing device 1A, 1B, 1C, 1D of the deodorization treatment system 50 is used to remove malodor from air containing malodor generated at a facility for producing livestock manure compost produced from excretion of livestock, such as horses, cows, pigs, and chickens. Further, for example, the microorganism deodorizing device 1A, 1B, 1C, 1D is used for removing malodor (hydrogen sulfide and the like) generated in a dehydration process in a paper factory. Further, for example, a microorganism deodorizing device 1A, 1B, 1C, 1D is used for removing malodor from air containing malodor generated in the production of a sewage compost produced from organic wastes in a treatment facility or the like of an organic waste such as sewage sludge. Further, the microorganism deodorizing device 1A, 1B, 1C, 1D can be used for removing malodor from facilities and devices that generate various kinds of malodor other than the specific examples described above.

REFERENCE SIGNS LIST

1A, 1B, 1C, 1D Microorganism deodorizing device
1 Deodorizing tank
2 Water storage tank
3 Chamber unit
4 Ventilation resistance layer (Ventilation resistance portion)
5 Deodorizing unit
7 Water sprinkling pipe
10 Insertion hole (Introduction portion)
11 U-shaped groove
13 Diffusion passage
16 Fall prevention member
17 Foam material
18 Ventilation resistance protrusion (Ventilation resistance portion)
19 Opening portion
20 Airflow passage
50 Deodorization treatment system
60 Sewage treatment facility, Urine treatment facility
70 Water sprinkling unit
100 Facility
200 Exhaust pipe
210 Sewage pipe (Inflow passage)
220 Treated water pipe (Outflow passage)
230 Bypass pipe
240 Return pipe
300 Blower
310 Pump
320 Pump
330 Pump
400, 410, 420, 430 On-off valve

The invention claimed is:

1. A microorganism deodorizing device comprising:

a hollow deodorizing tank which accommodates a foam material as a microorganism holding carrier, and that is configured to decompose and deodorize an odor component contained in air fed into the hollow deodorizing tank using microorganisms living in the foam material accommodated in the hollow deodorizing tank, wherein the hollow deodorizing tank is configured to form an airflow passage through which the air is passable from one side to an other side, and the airflow passage is provided with:

a deodorizing unit in which the foam material is filled in an entire region of the deodorizing unit and through which the air fed into the hollow deodorizing tank is flowable, the foam material formed from glass which is baked and foamed, a chamber unit at an inlet side of the deodorizing unit and configured as a chamber which temporarily stores the air fed into the hollow deodorizing tank, a partition wall above the chamber unit, the partition wall including a ventilation hole through which the air is passable from the chamber unit, an installation protrusion that protrudes inward from an inner wall of the hollow deodorizing tank and is above the partition wall, a rigid pallet above the installation protrusion and including a plurality of gaps through which the air is flowable, and a fall prevention member at an upper side of the rigid pallet, the fall prevention member formed in a substantially mesh shape and including a flexible material, a ventilation resistance portion above the rigid pallet and the fall prevention member, and including a ventilation resistance layer including some of the foam material mixed with rock wool, having a thickness, the ventilation resistance portion having a airflow resistance that is higher than an airflow resistance of the deodorizing unit, wherein the air fed to the hollow deodorizing tank to be flowed through the airflow passage passes through the ventilation hole of the partition wall, a space formed by the installation protrusion, the plurality of gaps, and the fall prevention member, and is spread in the chamber unit over a substantially entire surface of the deodorizing unit as a result of the airflow resistance of the ventilation resistance portion being higher than an airflow resistance of the deodorizing unit.

2. The microorganism deodorizing device according to claim 1, wherein the ventilation resistance portion extends in a flow direction of the air that passes through the airflow passage and covers a substantially entire area of the airflow passage in a horizontal direction.

3. The microorganism deodorizing device according to claim 2, wherein the ventilation resistance portion includes a ventilation resistance protrusion that protrudes inward from a wall surface of the hollow deodorizing tank.

4. The microorganism deodorizing device according to claim 1, wherein the chamber unit is arranged below the deodorizing unit in the hollow deodorizing tank, the airflow passage is formed such that the air that passes through the airflow passage passes upward from below the hollow deodorizing tank, and the chamber unit includes an introduction portion configured to introduce the air into the chamber unit, and a diffusion passage formed as a flow passage configured to diffuse, in a horizontal direction, the air from the introduction portion.

5. The microorganism deodorizing device according to claim 4, wherein the diffusion passage is formed by a plurality of U-shaped grooves.

6. The microorganism deodorizing device according to claim 4, wherein the fall prevention member is configured to prevent the foam material from falling into the chamber unit.

7. The microorganism deodorizing device according to claim 1, further comprising:

a water sprinkling pipe configured to introduce water to be sprinkled to the foam material; and a water storage tank configured to store water that has been sprinkled by the water sprinkling pipe and that is arranged below the hollow deodorizing tank, wherein the water sprinkling pipe is arranged along the hollow deodorizing tank and is capable of circulating and sprinkling water stored in the water storage tank.

8. A deodorization treatment system comprising:

the microorganism deodorizing device according to claim 1;

a sewage treatment facility which receives sewage from an inflow passage, performs purification treatment on the sewage, and discharges treated water to an outflow passage; and a water sprinkling unit configured to sprinkle a portion of the treated water to microorganisms in the microorganism holding carrier by introducing the portion to the microorganism deodorizing device and to return water that has been sprinkled by the water sprinkling unit and that has passed through the microorganism deodorizing device to an inflow passage side of the sewage treatment facility.

9. A deodorization treatment system comprising:

the microorganism deodorizing device according to claim 2;

a sewage treatment facility configured to receive sewage from an inflow passage, performs purification treatment on the sewage, and discharges treated water to an outflow passage; and a water sprinkling unit configured to sprinkle a portion of the treated water to microorganisms in the microorganism holding carrier by introducing the portion to the microorganism deodorizing device and to return water that has been sprinkled by the water sprinkling unit and that has passed through the microorganism deodorizing device to an inflow passage side of the sewage treatment facility.

10. The microorganism deodorizing device according to claim 5, wherein the fall prevention member is configured to prevent the foam material from falling into the chamber unit.

11. The microorganism deodorizing device according to claim 2, further comprising:

a water sprinkling pipe configured to introduce water to be sprinkled to the foam material; and a water storage tank configured to store water that has been sprinkled by the water sprinkling pipe and that is arranged below the hollow deodorizing tank, wherein the water sprinkling pipe is arranged along the hollow deodorizing tank and is capable of circulating and sprinkling water stored in the water storage tank.

12. The microorganism deodorizing device according to claim 3, further comprising:

a water sprinkling pipe configured to introduce water to be sprinkled to the foam material; and a water storage tank configured to store water that has been sprinkled by the water sprinkling pipe and that is arranged below the hollow deodorizing tank, wherein the water sprinkling pipe is arranged along the hollow deodorizing tank and is capable of circulating and sprinkling water stored in the water storage tank.

13. The microorganism deodorizing device according to claim 1, wherein the fall prevention member is configured to prevent the foam material from falling into the chamber unit.

14. The microorganism deodorizing device according to claim 13, wherein the rigid pallet is below the fall prevention member and the plurality of gaps form a lattice shape through which the air passes.

* * * * *